United States Patent [19]
Viala et al.

[11] Patent Number: 4,476,206
[45] Date of Patent: Oct. 9, 1984

[54] FIBER REINFORCED GRID FOR A STORAGE CELL, AND METHOD OF MANUFACTURING IT

[75] Inventors: Jean-Claude Viala, Villeurbanne; Jean Bouix, Lyons; M'hamed El Morabit, Villeurbanne; Dominique Micheaux, Villette d'Anthon; Gérard Dalibard, Sèvres, all of France

[73] Assignee: Compagnie Europeene d'Accumulateurs, Paris, France

[21] Appl. No.: 460,818

[22] Filed: Jan. 25, 1983

[30] Foreign Application Priority Data

Feb. 1, 1982 [FR] France .................... 82 01567

[51] Int. Cl.³ .................................... H01M 4/72
[52] U.S. Cl. ................................ 429/234; 29/2
[58] Field of Search ............... 429/234; 204/21; 29/2

[56] References Cited
U.S. PATENT DOCUMENTS

| | | | |
|---|---|---|---|
| 2,566,074 | 8/1951 | Suchy | 204/21 X |
| 2,694,743 | 11/1954 | Ruskin | 429/234 |
| 4,134,192 | 1/1979 | Parkinson et al. | 29/2 |
| 4,192,049 | 3/1980 | Parkinson et al. | 29/2 |
| 4,237,205 | 12/1980 | Matter | 429/234 |
| 4,356,242 | 10/1982 | Doniat | 429/234 |

Primary Examiner—Brian E. Hearn
Assistant Examiner—Stephen J. Kalafut
Attorney, Agent, or Firm—Kenyon & Kenyon

[57] ABSTRACT

A grid (10) for the plate of an electrical storage cell, eg. a lead-acid accumulator, comprises two orthogonal sets of conductive bars (7, 8) together with a current collector tab (9). The grid is made from a loosely-woven cloth comprising both bundles of conductive threads outlining the bars and the current collector of the plate, and bundles of non-conductive threads (6) serving to position said conductive threads relative to one another and to maintain them in position. Said bundles of conductive threads are embedded in a metal matrix comprising at least one of the metals in the group constituted by: lead, copper, cadmium, and nickel.

14 Claims, 5 Drawing Figures

FIBER REINFORCED GRID FOR A STORAGE CELL, AND METHOD OF MANUFACTURING IT

The present invention relates to grids for the plates of storage batteries.

The invention relates in particular to the grids used for supporting the active material of the negative plates in a lead-acid accumulator.

BACKGROUND OF THE INVENTION

The grids of a lead-acid accumulator perform two main functions: they conduct electrical current, and they retain the active material. They also have to stand up well to being immersed in sulphuric acid in order to ensure long battery life. Further, if they are made from material that possesses high hydrogen overvoltage, the battery can require little or no maintenance.

From the chemical and the electrochemical points of view, soft lead is a very good material for making negative grids, but its use is limited by its very poor mechanical properties.

That is the reason why most conventional grids are made of lead alloys that are much stronger mechanically than is pure lead. Nonetheless, the use of such alloys gives rise to grids which are relatively heavy and in which the chemical and electrochemical properties of soft lead are not fully conserved. Thus, in particular, hydrogen overvoltage or self discharge, is degraded, and this may be a handicap, particularly in starting or traction batteries.

Proposals have also been made to make grids by covering a plastic support with a conductive material, but this causes problems when it comes to soldering or welding the electrical terminal or tab of the grid to a current collector.

Grids can also be made by by sewing conductive threads to an inert felt, or by using alumina fibres which have been specially treated and impregnated with lead, but such solutions are relatively complex to put into effect, and are difficult to adapt to continuous manufacture on an industrial scale.

Finally, U.S. Pat. No. 4,134,192 describes method of making grids using cloth obtained by weaving insulating threads together with interlaced conducting threads along the warp and/or the weft. However, grids made in this way do not have adequate mechanical properties, particularly where rigidity is concerned.

Preferred implementations of the present invention mitigate the above-mentioned drawbacks, and in particular the invention can be used to provide a very light grid having remarkable mechanical characteristics.

SUMMARY OF THE INVENTION

The present invention provides a grid for the plate of an electrical storage cell, said grid comprising two orthogonal sets of conductive bars together with a current collector, wherein the grid comprises a loosely-woven cloth comprising both bundles of conductive threads outlining the bars and the current collector of the plate, and bundles on non-conductive threads serving to position and conductive threads relative to one another and to maintain them in position, said bundles of conductive threads being embedded in a metal matrix comprising at least one of the metals in the group constituted by: lead, copper, cadmium, and nickel.

The term "conductive thread" is used in this specification to include threads made from non-conductive material, but which are then rendered conductive by some suitable process such as metallisation.

The invention also provides a method of manufacturing a grid for the plate of an accumulator, the method comprising the steps of:
weaving a cloth as defined above,
electrolytically depositing at least one of the metals in the group constituted by: lead, copper, cadmium, and nickel on the conductive threads; and
cutting a grid out from the cloth after said step of depositing metal.

The conductive threads are thus embedded completely and individually in the metal matrix. The resulting composite material provides the remarkable mechanical properties of grids in accordance with the invention. Such properties would not be obtained if the bundles of conductive fibers were merely given an outer covering of metal.

The invention also provides accumulator plates provided with such grid, and indeed accumulators provided with such plates.

In one embodiment of the invention the non-conductive threads are for the most part in the weft of the cloth.

Advantageously, the bundles of conductive threads extending in the warp direction are enclosed between non-conductive threads which are gauze woven to the weft threads and which serve to consolidate the cloth. Conductive threads could also be used for this purpose.

The distance between adjacent parallel bundles of conductive threads should lie between 1.5 and 4.5 cm, and preferably between 2 and 3 cm.

There are preferably three to six non-conductive threads per centimeter extending along the weft direction between adjacent pairs of bundles of conductive threads.

Grids in accordance with the invention enable the excellent chemical and electrochemical properties of pure lead to be retained while obtaining a large reduction in weight compared with conventional grids made of lead alloys. The major part of the strength of grids in accordance with the invention comes from high strength-to-weight ratio fibers, and the lead practically serves only to conduct electrons, which needs little lead in a negative plate since the active material is itself conductive. Further, the lead may be partially or totally replaced by copper which is far better electron conductor, thereby providing an additional weight reduction. The main characteristics of composite grids, and in particular their low weight, mean that they are most useful in traction batteries for electric vehicles.

Carbon fibers make particularly useful conductive threads for grids in accordance with the invention because of their high strength and their resistance to attack by sulphuric acid. The conductive threads may also be made from non-conductive fibers whose surface has been made electrically conductive by any suitable known mechanical, physical or chemical process, e.g. by being wrapped in a conductive thread, by depositing metal by vacuum evaporation or by plasma projection, by chemical plating, etc., provided both that the non-conductive fibers are immune from attack by sulphuric acid and that the process for making the fibers conductive makes it possible to obtain an adherent, uniform and continuous electrolytic deposit of lead, copper or other metal after the weaving step. Thus, glass fibers or silicon carbide fibers metallised with copper or lead are suitable.

Preferred non-conductive fibers include glass fibers, alumina fibers and boron nitrate fibers, or any similar fibers, provided that they are likewise immune from attack by sulphuric acid. The non-conductive fibers perform two functions in the cloth: they ensure sufficient cohesion to enable the cloth to have metal deposited thereon without damage to the cloth; and after the active material has been pasted onto the grid, they serve as mechanical reinforcement for the active material and they also facilitate pasting.

The metal is deposited electrolytically and continuously in conventional manner. The deposition takes place selectively on the conductive fibers of the cloth leaving the non-conductive fibers intact and embedded in the metal matrix only where they cross the conductive fibers. Deposition takes place not only on the outside surfaces of the bundles of conductive fibers, but also on the surfaces of each of the threads which constitute the bundles.

The grid preform obtained after metal deposition is a good conductor of electrons, and it is strong enough to withstand subsequent processing without being damaged. This processing includes optional hot or cold rolling to bring the thickness of the preform down to a desired standard value; cutting out to obtain individual grids together with their contact tabs; and optional calendering to ensure they are plane. Grids obtained by this process are of much the same thickness as grids made of lead alloy, i.e. 0.6 to 1.8 mm. A large part of the weight reduction obtained relative to lead alloy grids comes from having the horizontal and vertical grid bars spaced further apart, which is made possible by the increased strength given to the active material by the bundles of non-conductive threads.

BRIEF DESCRIPTION OF THE DRAWINGS

Grids in accordance with the invention are described by way of example with reference to the accompanying drawings in which.

MORE DETAILED DESCRIPTION

Figure 1:
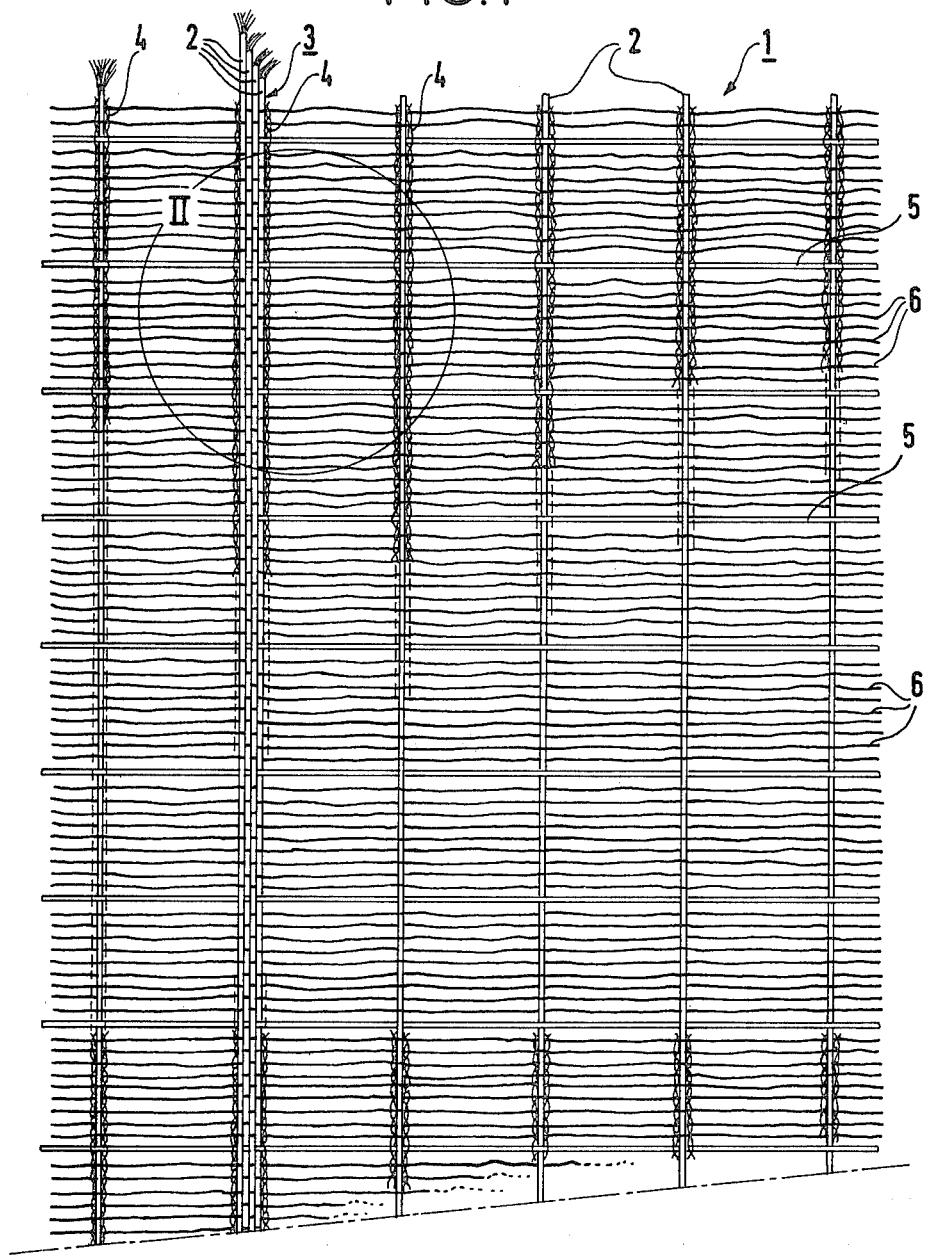
FIG. 1 is a diagrammatic view of a first cloth for use in making a grid in accordance with the invention.
Figure 2:
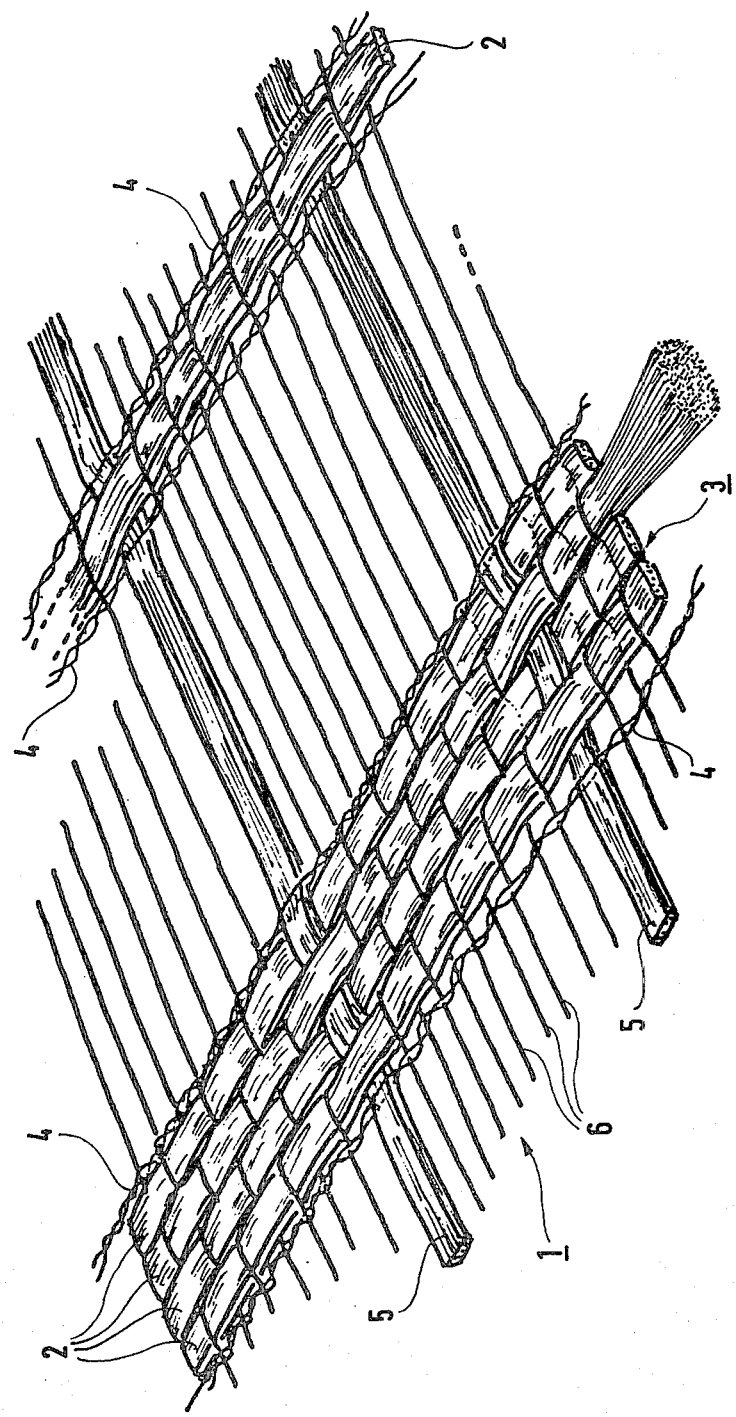
FIG. 2 is a perspective view on a larger scale of a portion II of FIG. 1.

FIGS. 1 and 2 show cloth 1 for forming part of the structure of a grid in accordance with the invention. The cloth comprises bundles of non-conductive threads and bundles of conductive threads, and which outline the bars and the current collector of the finished grid.

In the example described, the conductive threads are 400 tex and are constituted by 6000 strands of polyacrylo-nitrile (PAN) type carbon fibres, while the non-conductive threads are 240 tex and are made of C glass fibers.

The cloth 1 has a warp comprising bundles 2 of carbon fiber threads at a regular spacing of about 3.4 cm to constitute the vertical bars of the grid, with every fifth vertical bar comprising an enlarged bundle or group 3 of four bundles 2. The enlarged bundles 3 are about 7 mm wide and are for use in making electrical connections to the grid. The warp further comprises a gauze weave of glass fiber threads 4 disposed on either side of the bundles 2 and 3 of electrically conductive threads to ensure cohesion of the cloth.

The weft of the cloth 1 comprises both bundles 6 of glass fiber threads to ensure cohesion of the cloth and bundles 5 of conductive threads similar to the bundles 2 and at a regular spacing of about 2.6 cm to constitute the horizontal bars of the grid. In this example, the threads 4 form a gauze weave with the bundles 2, and there are nine bundles 6 disposed between adjacent bundles 5.

Textile oil is removed from the cloth by heating in air for 15 hours at about 300° C., and then a grid is made by electrolytically depositing metal on the cloth. To do this the cloth is passed through an electrolytic cell having lead anodes and containing an aqueous solution of lead sulphamate (1 mole/liter) and sulphamic acid (1 mole/liter) together with gelatin (2 grams/liter). The electrolyte is maintained at ambient temperature and is stirred constantly. Using a current density of 1 A per $dm^2$ of cloth, a continuous, adherent and dendrite-free deposit of lead is obtained on the conductive threads. After the lead has been deposited, the cloth is rinsed in soft water, dried, and rolled to a thickness of 1.5 mm before being cut into grids which are 18 cm high by 17 cm wide.

Figure 3:
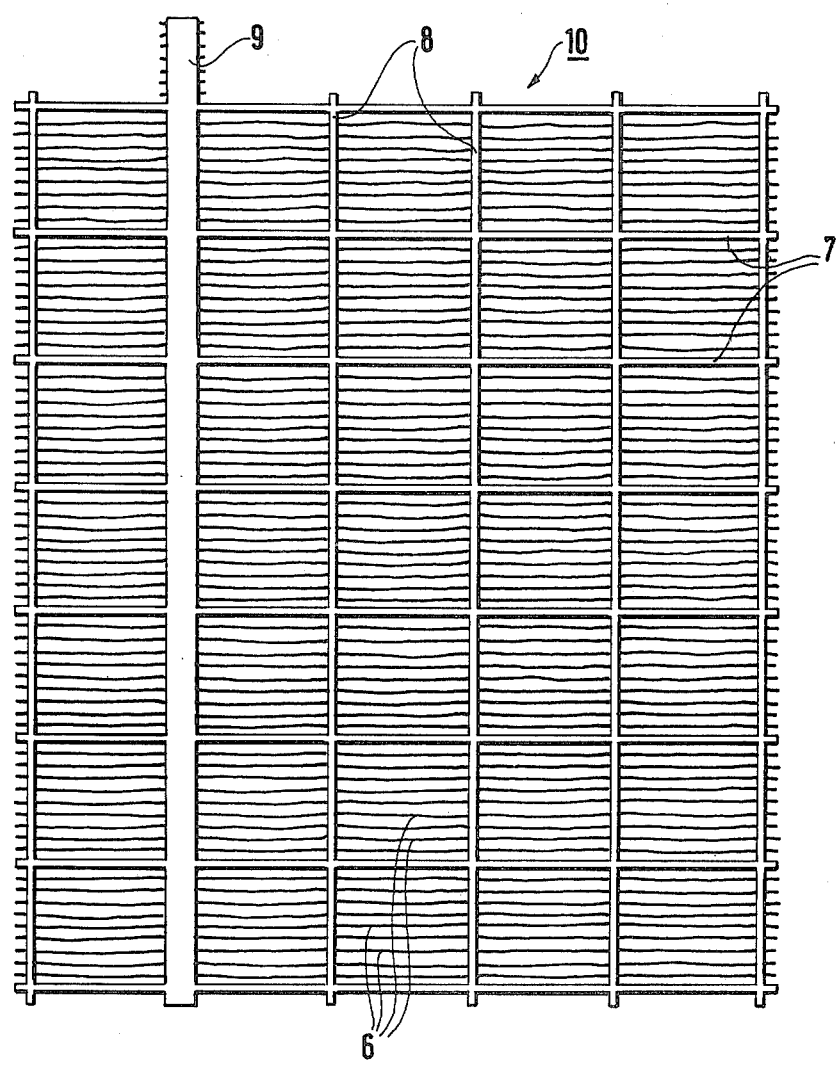
FIG. 3 is a view of a grid made from the cloth shown in FIG. 1.

Such a grid is shown in FIG. 3, where the references 7 and 8 designate horizontal and vertical bars respectively, and the reference 9 designates the grid contact tab. This structure is obtained after lead has been electrolytically deposited on the bundles 2, 3 and 5 of conductive threads.

The non-conductive threads 4, which are intended to improve cohesion of the cloth 1, are not shown in FIG. 3.

Such a grid weighs about 6.5 grams/$dm^2$. It has eight horizontal bars 7 and six vertical bars 8 with the connector tab 9 being an extension of the second vertical bar 8 and extending for about 2 cm.

A grid of the same configuration manufactured in the usual manner using a lead alloy would weigh about 70 grams, while the grid in accordance with the invention shown in the figure weighs about 20 grams, of which about 3 grams is cloth. It can thus be seen that there is a considerable reduction in weight.

Further, electrolytic deposition of pure lead avoids hydrogen being involved when the grids are used in the manufacture of negative electrodes in lead-acid accumulators after being pasted and formed using conventional techniques.

Grids having other characteristics can also be made from cloth as described with reference to FIGS. 1 and 2.

For example, the textile oil may be removed by immersing the cloth for four hours at ambient temperature in concentrated sulphuric acid, after which copper may be electrolytically deposited thereon in a cell containing copper sulphate (0.75 moles/liter), sulphuric acid (0.75 moles/liter) and gelatin (0.2 grams/liter). The resulting grids are mechanically stronger and electrically more conductive than lead coated grids.

The conductive threads could also be 200 tex, for example, and made from silicon carbide. However, such fibers are not sufficiently conductive on their own to be directly coated with metal by electrolytic deposition. Thus, once the cloth has been made, and after the textile oil has been removed, e.g. by heating to 300° C. for 15 hours under an argon atmosphere, the cloth is chemically plated by conventional means, e.g. with copper. The chemical plating only effects the silicon carbide fibers, thus making them conductive, while the glass fibers are left unaffected.

Figure 4:
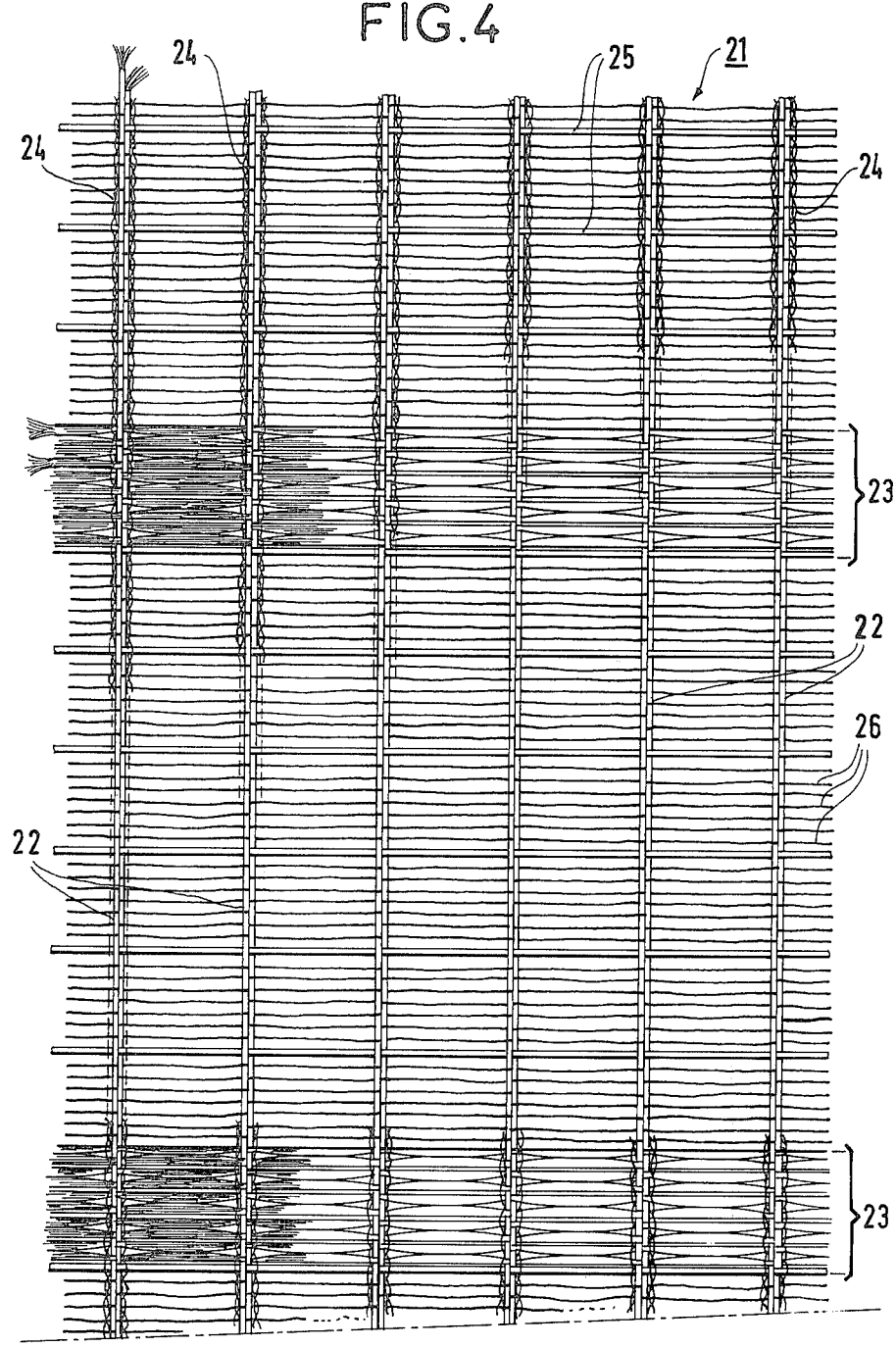
FIG. 4 is a diagrammatic view of a second cloth for use in making a grid in accordance with the invention.

FIG. 4 is a diagrammatic view of a second cloth 21 suitable for making grids in accordance with the invention.

The conductive and the non-conductive threads are of the same types as described with reference to FIGS. 1 and 2.

The cloth 21 has a warp comprising bundles 22 of carbon fiber threads at a regular spacing of about 3 cm to constitute the vertical bars of the grid. The bundles 22 are each twice as wide as the bundles 2. The warp further comprises a gauze weave of glass fiber threads 24 disposed on either side of the bundles 22 to ensure cohesion of the cloth.

The cloth 21 has a weft comprising bundles 25 of carbon fibers at a regular spacing of about 2 cm to constitute the horizontal bars of the grid. The bundles 25 are of the same width as the bundles 2. Every sixth bundle 25 comprises an enlarged bundle 23 which is about 3.3 cm wide and comprises about ten individual bundles 25 to constitute a reinforcement from which the grid's contact tab is to be cut.

The cloth 21 also has glass fibre bundles 26 in its weft to provide cohesion to the cloth. In the example shown, there are seven glass fibre bundles 26 between each pair of adjacent carbon fiber bundles 25.

The cloth 21 is then processed in a similar manner to the cloth 1, and a lead coating is applied electrolytically under identical conditions. The cloth is cut into grids which are 12 cm high and 15 cm wide, giving a density of about 12 grams/dm$^2$.

Figure 5:
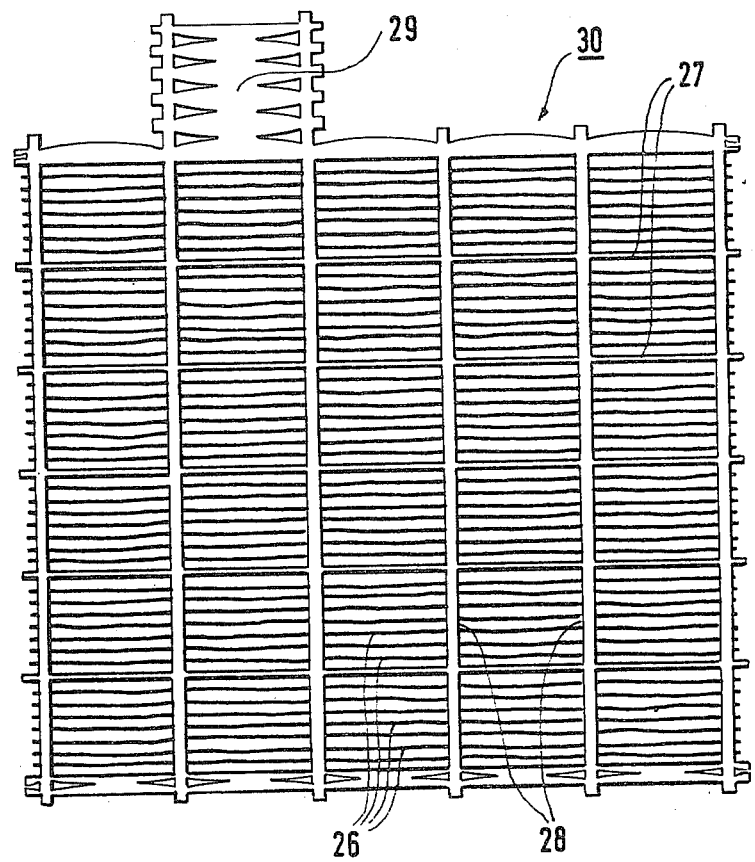
FIG. 5 is a view of a grid made from the cloth shown in FIG. 4.

Such a grid shown in FIG. 5, where the references 27 and 28 designate horizontal and vertical bars respectively, and the reference 29 designates the grid contact tab. This structure is obtained after metal has been deposited on the bundles 22, 23 and 25 of conductive threads.

The non-conductive threads 24 for improving the cohesion of the cloth 21 are not shown in FIG. 5.

The grid comprises seven horizontal bars 27 and six vertical bars 28, and the grid contact tab 29 extends for about 3 cm from the space between the second and third vertical bars 28.

The cloth in the grid weighs about 3.4 grams, while the grid as a whole weighs about 21 grams.

The improved mechanical properties of grids in accordance with the invention having bundles of conductive fibres embedded in a matrix of metal compared with conventional grids made from soft lead or from a lead alloy such as a lead-antimony alloy, for example, are due to the different mechanical characteristics of the various materials. Thus the ultimate tensile stress UTS, measured in MPa, is 13.7 for soft lead, 18 for a lead-antimony alloy containing 1.8% antimony, 200 for a Pb/SiC composite having 12% by volume SiC fibers, 350 for a Pb/SiC composite having 18% by volume SiC fibres, and 330 for a Pb/C composite having 25% by volume carbon fibers.

At the same time the breaking strain is much less for the composites, being about 1%, whereas it is 27% for soft lead and 40% for the lead-antimony alloy.

Finally, it has been observed that the composites behave substantially elastically for stresses up to about $\frac{1}{2}$ UTS.

Grids in accordance with the invention are used to manufacture accumulator plates by pasting and forming in the usual manner. When the cloth has been electrolytically covered with lead, the grid is particularly suitable for making negative plates for lead-acid accumulators.

Grids in accordance with the invention have been subjected to 250 charge-discharge cycles, and it has been observed that there is no deterioration. In particular, the presence of the bundles of non-conductive threads 4 and 24 provides excellent retention of the active material.

To improve cohesion of the cloth, instead of using two pairs of gauze woven non-conductive threads along the sides of the longitudinal conductive threads, a single non-conductive thread could be used as the turning thread in a gauze weave in conjunction with a conductive thread used as the straight thread. Another technique would be to wind a thread around the bundles, in which case the thread should be conductive or should be made conductive in order to ensure a uniform electrolytically deposited covering of metal.

Further, although the conductor threads have been described as passing over and under one another to constitute a conventionally woven cloth, it has been observed that it can be advantageous to make a cloth in which the conductor threads are merely superposed, with the cloth being held together by the non-conductive fibers being woven.

We claim:

1. A support grid for a plate of an electric storage cell, wherein said grid comprise a loosely woven cloth containing two orthogonally intersecting sets of spaced apart bundles of conductive threads extending in the warp and weft directions, respectively, of the cloth, said bundles of conductive threads being embedded in a matrix of at least one metal selected from the group consisting of lead, copper, cadmium, and nickel to form a unitary group of orthogonal sets of conductive bars together with a current collector, and the cloth further containing bundles of non-conductive non-embedded threads extending in at least one of the warp and weft directions and serving to locate and to maintain in position the bundles of conductive threads relative to one another.

2. A grid according to claim 1, wherein said matrix metal is of electrolytic origin.

3. A grid according to claim 1, wherein the loosely woven cloth further contains a plurality of non-conductive non-embedded weft threads between each bundle of conductive threads extending in the weft direction, said non-conductive weft threads comprising the majority of the non-conductive threads in said cloth.

4. A grid according to claim 3, wherein said plurality of non-conductive, non-embedded weft threads comprise three to six threads per centimeter in the warp direction between adjacent pairs of said bundles of conductive threads extending in the weft direction.

5. A grid according to claim 3, wherein the bundles on non-conductive, non-embedded threads extending in the warp direction comprise pairs of threads gauze woven to the weft threads and enclosing said bundles of conductive threads extending in the warp direction so as to consolidate the cloth.

6. A grid according to claim 1, wherein the bundles of conductive threads extending in the warp direction are enclosed between conductive threads which serve to consolidate the cloth.

7. A grid according to claim 1, wherein at least some of the bundles of conductive threads extending along one of the warp and weft directions of the cloth are wider than the bundles of conductive threads extending along the other of the warp and weft directions.

8. A grid according to claim 1, wherein adjacent parallel bundles of said conductive threads are spaced apart by a distance between 1.5 and 4.5 cm.

9. A grid according to claim 1, wherein the non-conductive threads are made of glass fibers capable of withstanding sulphuric acid.

10. A grid according to claim 1, wherein the material of said bundles of conductive threads is selected from the group consisting of carbon fibers, metallized silicon carbide fibers, and metallized glass fibers.

11. A plate for an electric storage cell comprising a grid according to claim 1.

12. An electric storage cell comprising a plate according to claim 11.

13. A method of manufacturing a support grid for a plate of an electric storage cell, the method comprising the steps of:

weaving a loosely woven cloth containing two orthogonally intersecting sets of spaced apart bundles of conductive threads extending in the warp and weft directions, respectively, of the cloth and bundles of non-conductive threads extending in at least one of the warp and weft directions and serving to locate and to maintain in position the bundles of conductive threads relative to one another;

electrolytically depositing at least one metal selected from the group consisting of lead, copper, cadmium, and nickel selectively on only the bundles of conductive threads to produce a unitary group of orthogonal sets of conductive bars formed by said bundles of conductive threads embedded in a matrix of said deposited metal; and cutting a grid out from the cloth after said metal depositing step.

14. A method according to claim 13, the method further comprising the step of passing the cloth between a pair of rolls having predetermined spacing for setting the thickness thereof after said metal depositing step and before said step of cutting out a grid.

* * * * *